United States Patent
Strauss

(10) Patent No.: US 11,358,319 B2
(45) Date of Patent: Jun. 14, 2022

(54) SYSTEM AND METHOD FOR STATE MONITORING OF LINEAR DRIVES OF STRETCHING AND/OR BLOW MOULDING MACHINES

(71) Applicant: KRONES AG, Neutraubling (DE)

(72) Inventor: Johannes Strauss, Wolfsegg (DE)

(73) Assignee: KRONES AG

(*) Notice: Subject to any disclaimer, the term of this patent is extended or adjusted under 35 U.S.C. 154(b) by 87 days.

(21) Appl. No.: 16/643,685

(22) PCT Filed: Sep. 3, 2018

(86) PCT No.: PCT/EP2018/073575
§ 371 (c)(1),
(2) Date: Mar. 2, 2020

(87) PCT Pub. No.: WO2019/043211
PCT Pub. Date: Mar. 7, 2019

(65) Prior Publication Data
US 2020/0223123 A1 Jul. 16, 2020

(30) Foreign Application Priority Data
Sep. 1, 2017 (DE) ...................... 10 2017 120 161.0

(51) Int. Cl.
*B29C 49/78* (2006.01)
*B29C 49/12* (2006.01)

(52) U.S. Cl.
CPC .............. *B29C 49/78* (2013.01); *B29C 49/12* (2013.01); *B29C 2049/129* (2013.01); *B29C 2949/78117* (2013.01); *B29C 2949/78184* (2013.01)

(58) Field of Classification Search
CPC .......................... B29C 49/78; B29C 2049/129
See application file for complete search history.

(56) References Cited

U.S. PATENT DOCUMENTS

| 6,576,171 B1 * | 6/2003 | Devenoges | B29C 49/12 264/40.1 |
| 7,853,413 B2 | 12/2010 | Haberl et al. | 702/41 |

(Continued)

FOREIGN PATENT DOCUMENTS

| DE | 10 2008 013 419 | 9/2009 | B29C 49/78 |
| EP | 1 066 149 | 6/2002 | B29C 49/78 |

(Continued)

OTHER PUBLICATIONS

German Search Report issued in German Patent Appln. No. 10 2017 120 161.0 dated Jul. 9, 2018, 8 pgs.
(Continued)

Primary Examiner — Timothy Kennedy
Assistant Examiner — Alexander A Wang
(74) Attorney, Agent, or Firm — Hayes Soloway P.C.

(57) ABSTRACT

A linear drive for a stretch and/or blow moulding machine has a force sensor for detecting actual force absorption of the linear drive during operation, a storage device in which data for a desired force absorption during operation are stored, and a comparison device for comparing actual force absorption with desired force absorption and a signal emitter for outputting a signal if a previously defined deviation between desired force absorption and actual force absorption is exceeded. Also provided is a method for determining a friction coefficient of a linear drive for a stretching and/or blow moulding machine, by determining a desired force absorption of the linear drive during operation, detecting using a force sensor, actual force absorption of the linear drive during operation, comparing actual force absorption with desired force absorption, and outputting a signal if a previously defined deviation between desired force absorption and actual force absorption is exceeded.

9 Claims, 4 Drawing Sheets

(56) References Cited

U.S. PATENT DOCUMENTS

| | | | | |
|---|---|---|---|---|
| 9,545,748 | B2 | 1/2017 | Balkau et al. | B29C 49/78 |
| 2010/0078861 | A1 | 4/2010 | Herklotz et al. | 264/532 |
| 2012/0139169 | A1 | 6/2012 | Finger | 264/532 |
| 2014/0298100 | A1* | 10/2014 | Grimm | B67B 3/26 |
| | | | | 714/37 |
| 2017/0157834 | A1 | 6/2017 | Protais | B29C 49/78 |

FOREIGN PATENT DOCUMENTS

| | | | |
|---|---|---|---|
| EP | 1 484 160 | 3/2004 | B29C 49/12 |
| EP | 2 048 556 | 10/2007 | G05B 19/404 |
| JP | 11-348101 | 12/1999 | B29C 49/12 |

OTHER PUBLICATIONS

International Search Report and Written Opinion issued in PCT/EP2018/073575, dated Dec. 12, 2018, with English translation, 21 pgs.

International Preliminary Report on Patentability issued in PCT/EP2018/073575, dated Mar. 3, 2020, 8 pgs.

* cited by examiner

SYSTEM AND METHOD FOR STATE MONITORING OF LINEAR DRIVES OF STRETCHING AND/OR BLOW MOULDING MACHINES

BACKGROUND OF THE INVENTION

The present invention relates to a linear drive for a stretching and/or blow moulding machine, which facilitates a comparison the actual force absorption with the desired force absorption, and a method for determining a cleaning interval on the basis of a comparison of the actual force absorption with the desired force absorption of a linear drive for a stretching and/or blow moulding machine.

Stretching and/or blow moulding machines for the production of PET bottles are known from the prior art. In these machines, during the reshaping of parisons (also referred to below as "preforms") into containers, in particular bottles, the stretching process of the preforms is carried out for optimal material distribution by stretching rods which are driven by controlled servo-linear drives. The mounting of these linear drives is generally designed as a plastic plain bearing. The magnetic rotor flux is often generated with permanent magnets. In such stretching units (also designated below as stretching devices) it is important in particular that the movement of the stretching unit during the blow moulding process follows a movement which is predetermined exactly in terms of time and path. If it should not be possible to comply with this predetermination, this can lead to deterioration of the container quality or to faults.

In the stretching and/or blow moulding machines which are known from the prior art the movement of the stretching unit can be negatively influenced by external faults or by excessively high friction. Excessive contamination of the rotor is frequently the cause of excessive friction. The contamination of the rotor is favoured by its magnetisation, because as a result ferromagnetic particles of dirt are attracted and can accumulate permanently thereon.

A further cause for negative influencing of the movement the stretching unit could be an incorrectly fitted stretching unit. Many embodiments available on the market have, in addition to the motor mounting, a mounting for the externally attached stretching rods on a slide. In this way the overall mounting is over-determined, so that in the event of inexact installation a distortion of the stretching unit can occur.

If these negative effects add up to an impermissible contamination of the stretching drive this can result in a failure of or faults in the stretching unit. In order to prevent such a failure of the stretching unit, it is conventional to clean the rotor at regular intervals. Depending upon the degree of contamination of the environment, the necessary intervals for the cleaning differ significantly. In particular the degree of contamination with (metallic) particles brings about substantial changes to the maintenance interval. Since these environmental conditions can change during the operation of a stretching and/or blow moulding machine, it is difficult to determine a generally appropriate maintenance interval in order to be able to operate at optimal costs. In addition, due to the distortions described above the degree of contamination which is still tolerable during operation can be changed in an unknown manner, so that predictions about an optimal maintenance interval are not possible.

SUMMARY OF THE INVENTION

Therefore, the object of the present invention is to provide a linear drive for a stretching and/or blow moulding machine which monitors operating parameters and supplies instructions for necessary maintenance. Moreover, it is an object of the invention to provide a method for determining an optimal maintenance interval for a linear drive for a stretching and/or blow moulding machine.

This object is achieved on the one hand by a linear drive for a stretching and/or blow moulding machine which comprises
 a) a force sensor for detecting the actual force absorption of the linear drive during operation,
 b) a storage device in which data for a desired force absorption of the linear drive during operation are stored,
 c) a comparison device for comparing the actual force absorption with the desired force absorption and
 d) a signal emitter for outputting a signal when a previously defined deviation between desired force absorption and actual force absorption is exceeded.

Such a linear drive for a stretching and/or blow moulding machine is capable of determining and evaluating al required information from the drive control for identification of the friction in the system (or the stretching unit) during normal operation. In this case a very precise determination of the friction is advantageous, since this has a significant influence on the necessity for maintenance. Although the friction only makes up a small proportion of all forces occurring in the system or the linear drive, the monitoring of the friction is possible by such a linear drive.

In a preferred embodiment the force sensor is a detector for the current consumption necessary for movement of stretching rod. This has proved advantageous, since such a detector can be implemented in a very compact manner and therefore can be integrated comparatively simply into existing installations. Furthermore, it has been shown that the current consumption is a particularly suitable parameter for determining the friction occurring in the system during the movement of the stretching rod.

In a preferred embodiment the data for a desired force absorption of the linear drive during operation are calculated from parameters which are selected from a group comprising the weight force of the moving parts, the inertial force of the moving parts depending upon the underlying movement profile, the pressure prevailing in the container or the preform, the pneumatically effective surfaces of the system and the frictional force of the stretching unit. In this way it is possible to set or convert the system to frequently changing process parameters, which dominate the forces occurring on the stretching drive. The force on the linear drive is preferably made up of the weight force of the moving parts, the inertial force of the moving parts (depending upon the movement profile) and the force which is produced by the pressure in the container and acts on the horizontal cross-section of the stretching rod.

Since the movement profile is known, the resulting force can be calculated. Likewise, the mass to be moved during the reshaping process is known or can be determined comparatively simply. The pneumatically effective surfaces are known, so that on the basis of the blow moulding pressure in the container, which in some instances is already continuously monitored in existing reshaping installations for monitoring the process, the pressure acting thereon can be determined. A model which can predict the force to be expected on the linear drive is preferably calculated from this information. If the above-mentioned data are used as a basis, the only unknown is the frictional force on the stretching unit. For determination of these data, in a preferred embodiment for example during an optimising process the model could be simulated with different values for the frictional force until the absorption of force determined from the model has approximated the measured absorption of force up to a predetermined maximum deviation.

In a preferred embodiment a data set stored in the storage device comprises a plurality of data which comprise the force necessary for movement of the stretching rod at different times during the stretching process. In a further preferred embodiment, a data set comprises at least 2, preferably at least 10 particularly preferably at least 50 data points stored in the storage device which map the force necessary for movement of the stretching rod at different times. In a further preferred embodiment, the data set comprises a continuous profile of the force necessary for movement of the stretching rod over the duration of the process.

In a preferred embodiment the data set contains a formula by means of which, for each time during the process, the respective desired force absorption can be calculated in a calculating device. The calculating device is preferably a microprocessor.

In a preferred embodiment the storage device comprises a plurality of data sets for the desired force absorption of the linear drive for different reshapings of preforms into containers. In this way it is possible to convert the system quickly to changed process conditions. For example, in the event of a product changeover, in which for the stretching/blow moulding process other preforms for example different preforms are used and/or other containers are produced, it is furthermore possible to monitor the frictional force occurring during the movement of the stretching rod. Thus, it is to be able to determine the contamination of the stretching unit, independently of the product currently being produced, by means of the frictional force to be overcome.

The linear drive is preferably part of a stretching/blow moulding machine for reshaping plastic parisons into plastic containers, preferably a stretching and/or blow moulding machine. In such an apparatus the plastic preforms are first of all thermally conditioned in a heating section and then are expanded by application of a liquid or gaseous (and thus flowable) medium. The flowable medium is preferably under pressure. For the delivery of the pressurised medium the apparatus has a blow moulding die which can be placed onto a mouth of the plastic preforms to form a seal, in order thus to expand the plastic preforms with liquid or gaseous medium. In addition, a valve assembly is preferably also provided, which controls the delivery of the blowing air to the plastic preforms.

In a stretch and/or blow moulding machine the preforms are expanded in the longitudinal direction by means of a stretching rod before and/or during the expansion. In this case the blow moulding stations each have stretching rods, which can be introduced into the plastic preforms and expand the plastic preforms in their longitudinal direction. In this case the stretching rods preferably have an electrical drive.

In one advantageous embodiment a plurality of blow moulding stations are arranged on a common movable support. In this case this support is in particular a rotatable support. The blow moulding stations each have a blow moulding device preferably forming a hollow space inside which the plastic preforms can be expanded into the plastic containers. In this case these blow moulding devices are preferably formed in multiple parts and each have two blow mould halves and a base mould. These blow mould halves can preferably be releasably arranged on a mould support shell or on the blow mould supports. The blow mould supports are pivotable with respect to one another in order to open and to close the blow moulding devices. Moreover, the blow mould support has locking mechanisms in order to lock the mould halves with respect to one another during the blow moulding process.

Particularly preferably, the blow moulding machine or the supports and the blow moulding arrangements are arranged inside a clean room which demarcates the blow moulding machine relative to an unsterile environment. In this case, driving devices for the closing, locking and/or opening of the blow moulds are preferably arranged outside the clean room.

The blow mould devices are preferably transported inside the clean room. The clean room is preferably delimited by a plurality of walls. In this case the clean room is delimited by at least one stationary wall and a wall which is movable relative to this stationary wall. The clean room demarcates the blow moulds in particular from an unsterile environment. The clean room is advantageously formed in an annular or toroidal manner around the blow moulding stations or reshaping stations and/or the transport path of the plastic containers.

The invention further relates to a method for determination of a friction coefficient of a linear drive for a stretching/blow moulding machine, comprising the following steps:
  determining a desired force absorption of the linear drive during operation,
  detecting an actual force absorption of the linear drive during operation by means of a force sensor,
  comparing the actual force absorption with the desired force absorption,
  outputting a signal when a previously defined deviation between desired force absorption and actual force absorption is exceeded.

If the actual force absorption exceeds the desired force absorption by a previously determined value, this can be attributable to an increased friction during the movement of the stretching rod. Therefore, if such a situation occurs, a signal is output which indicates the necessity for prompt maintenance.

Preferably, the information from the drive control (in particular the actual force absorption) for identification of the friction in the stretching unit system are used during normal operation. In this case it is important to carry out very precise determination of the friction, which is very difficult, since the forces occurring in the normal process are highly dominant and the frictional force represents only a small proportion of the entire force on the linear drive. Thus, the frictional force to be overcome in the drive usually has only a small proportion of the entire force which is to be applied to the linear drive. Furthermore, many process parameters which dominate the force on the stretching drive, change continuously. The force on the linear drive is made up of the weight force of the moving parts, the inertial force of the moving parts (depending upon the movement profile) and the force which is produced by the pressure in the bottle and acts on the horizontal cross-section of the stretching rod.

A variant of the method is preferred in which the data for a desired force absorption of the linear drive during operation are calculated from parameters which are selected from a group comprising the weight force of the moving parts, the inertial force of the moving parts depending upon the underlying movement profile, the pressure prevailing in the container or the preform, the pneumatically effective surfaces of the system and the frictional force of the stretching unit. It has been shown that these parameters have a significant influence on the force absorption of the linear drive during operation, so that deviations of the desired force absorption determined therefrom indicate undesirable conditions.

A further problem is that several of the aforementioned process parameters which dominate the force on the stretching drive can change during the process. Examples of this are the inertial force of the moving parts (depending upon the movement profile) and the counter-pressure which results from the pressure of the container to be deformed on the horizontal cross-section of the stretching rod. The gas pressure in the interior of the container as a variable quantity can then influence the counter-pressure.

Both the movement profile and also the mass to be moved is usually known or can be determined simply. The pneumatic active surfaces are known and the blow moulding pressure in the bottle is already monitored and continuously measured for process monitoring in modern reshaping devices already.

In a preferred variant of the method a model which can predict the force to be expected on the linear drive is calculated from at least some of the above-mentioned data. Thus, the only unknown is the frictional force on the stretching unit. In a subsequent step the frictional force is determined in an optimisation process, in which the model simulates with different values for the frictional force until the results from the model best match the measured force from the drive controller. Thus, preferably, from the above-mentioned parameters or at least from a selection of the above-mentioned parameters first of all a model is calculated which includes a variable for the frictional force on the stretching unit and only in a subsequent optimisation process are simulations of the desired force absorption of the linear drive carried out by variation of values for the frictional force simulation until a sufficiently good approximation between the simulation of the desired force absorption and the actual force absorption of the linear drive (in the—uncontaminated—ideal state) is achieved.

If, as described above, the desired force absorption is determined for at least several times in the process, preferably over the entire duration of the process, a very high precision of the frictional force can be determined regardless of the other process parameters during the production. This is also achieved in this method if the measured values are very noisy, since due to the simulation the complete desired progression of the force is known.

In a preferred variant of the method, a time range of the process which is particularly suitable for identification of the friction coefficient is selected for comparison of the actual force absorption with the desired force absorption. In a further preferred variant of the method, a time range of the process which is particularly suitable for identification of the desired parameter is also already selected in the optimisation process. In this way the quantity of data and also the cost of determining the desired force absorption can be reduced.

For this purpose, in a preferred variant, the model is repeatedly calculated with varying parameters and is compared in the required comparison time window with the measurement of the actual force absorption of the linear drive (in the—uncontaminated—ideal state). The evaluation of the standardised sum of all errors from this comparison is preferably included in the optimised performance of the parameters so that in the comparison time window the standardised error assumes a minimum as quickly as possible. In this way undesirable vibrations and noise can be averaged out from the result.

In a particularly preferred variant of the method, not only is the amount of the deviation between the desired force absorption and the actual force absorption considered for identification of necessary maintenance. In fact, in a preferred variant of the method it is possible to draw a conclusion as to the nature of the error to be expected from the location and/or shape of the characteristic of the deviation between the desired force absorption and the actual force absorption in a diagram in which the force absorption is plotted against the time. Thus, it is possible for example, by the model-based evaluation, to distinguish between a contamination and a distorted mounting. In particular, due to a modelling of these two mechanisms taking place separately from one another in the simulation it is possible to consider them separately.

Thus it is possible, not only to determine the maintenance cycles for the cleaning of the stretching units (on the basis of an increase in the determined friction coefficients) as required, but also any errors in the installation of the stretching units can already be identified and eliminated at start-up by the comparison of the actual force absorption with the desired force absorption.

Furthermore, the method described above makes it possible to obtain a more precise understanding of the procedures during the process of reshaping a preform into a container. Thus, for example information for the stretching process can be obtained from the modelling. By comparison of the simulation and the measurement for example it is possible to determine the progression of the necessary force with which the preform, during its reshaping into the container, counteracts the movement of the stretching rod. An evaluation of this force enables an assessment of the stretching/blow moulding process.

Further advantages and embodiments are disclosed by the appended drawings.

DETAILED DESCRIPTION OF THE INVENTION

Figure 1:
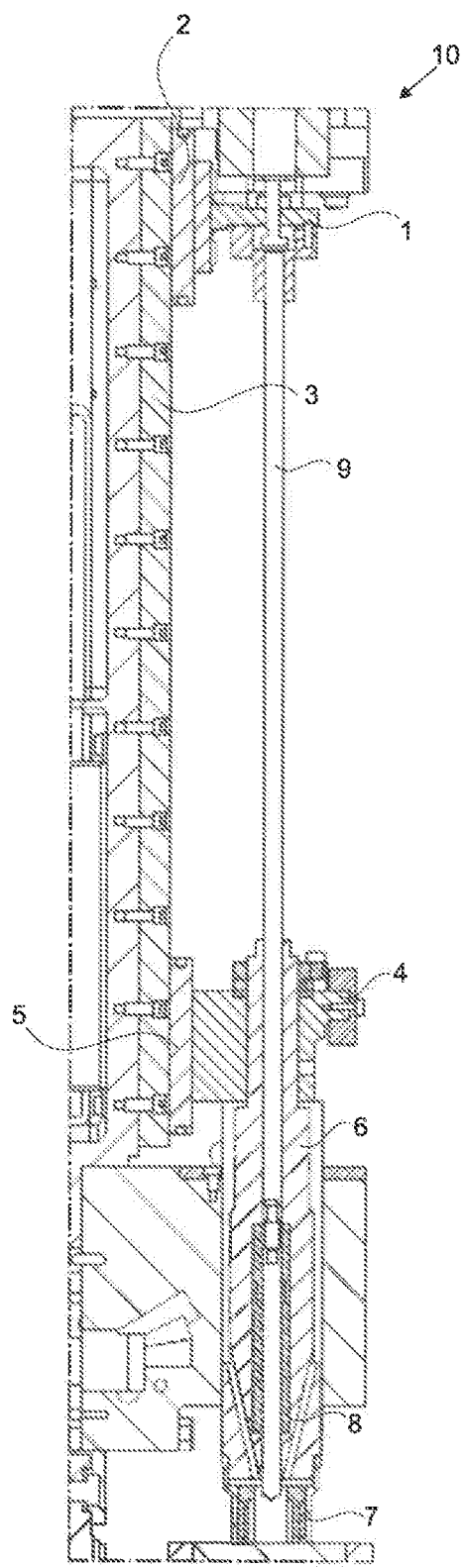
FIG. 1 shows a view of a stretching device.
Figure 2:
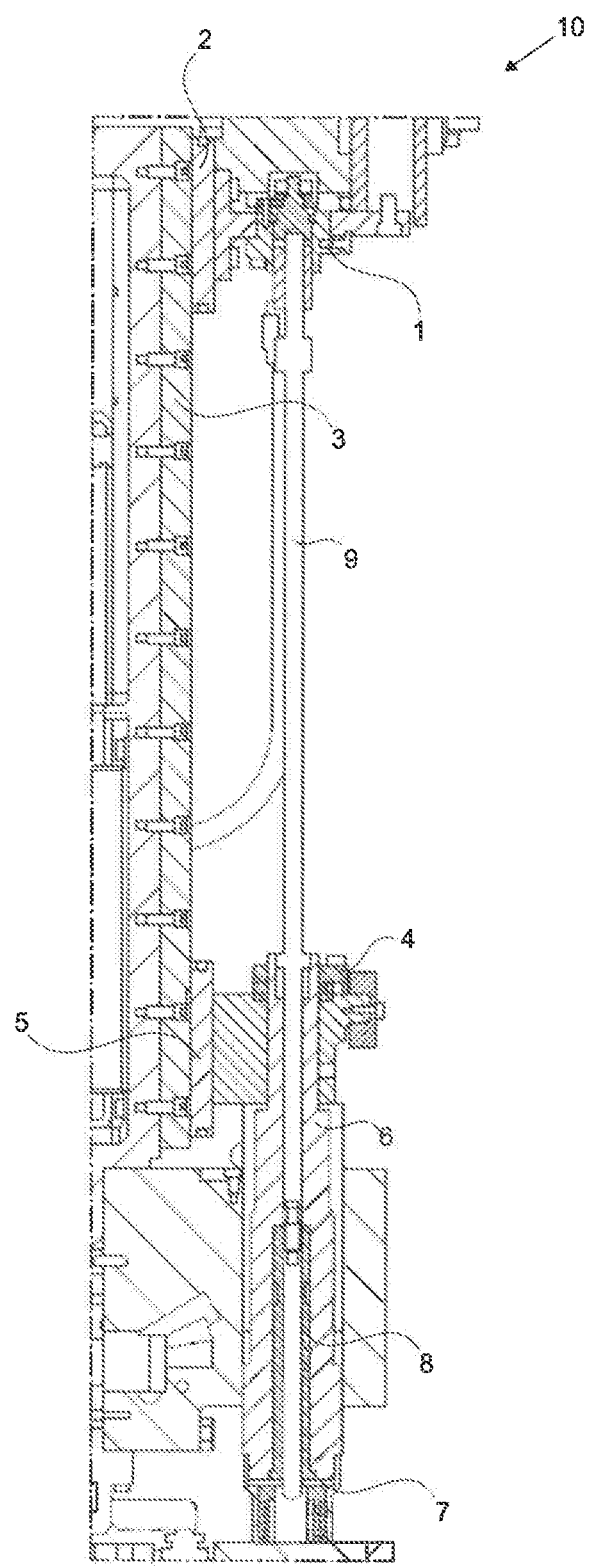
FIG. 2 shows a view of another design variant of a stretching device.

FIG. 1 and FIG. 2 show respectively a view of different designs of a stretching device 10. In spite of the different designs, elements which are the same or used can be identified by the same references. Both illustrated stretching devices comprise a stretching slide 1, which is arranged movably by means of a guide carriage 2 relative to a guide track 3 which is not illustrated in detail.

Furthermore, a blow moulding slide 4 is illustrated, which is likewise movable by means of a guide carriage 5 along the guide track 3.

Moreover, a blow moulding piston 6 is illustrated, which has a blow moulding die 7 arranged on its end remote from the stretching slide 1. In the interior of the blow moulding piston is located a guide sleeve 8, in which the stretching rod 9 is guided. The stretching rod 9 is relatively movable with respect to the blow moulding piston 6 and thus also with respect to the blow moulding slide 4 arranged. The relative movement is achieved by a displacement of the stretching slide 1, to which the stretching rod 9 is fixedly connected, with respect to the blow moulding slide 4. The displacement is preferably implemented by means of an electric motor (not shown), of which the current consumption is monitored and from which the actual force absorption can be determined.

Possibilities for an increase in the actual force absorption can essentially have two causes. The first cause may be contamination of parts which are movable relative to one another. Deposits can form in particular on the stretching rod 9 and the guide track 3, which can give rise to a friction coefficient. In particular if the magnetic rotor flux is produced with permanent magnets, this creates the problem that the rotor is magnetised and attracts magnetic particles. These remain adhered due to the magnetism and can also increase in such a way that correct operation of the reshaping device is no longer guaranteed.

Moreover, or additionally, an increased friction coefficient can result from inexact installation or undesirable displacements of individual assemblies relative to one another, which can lead to a distortion of the stretching unit 10 itself. These negative effects, alone or in combination, can lead to an impermissible contamination or the stretching drive which can result in a failure or malfunctions of the stretching unit.

Figure 3:
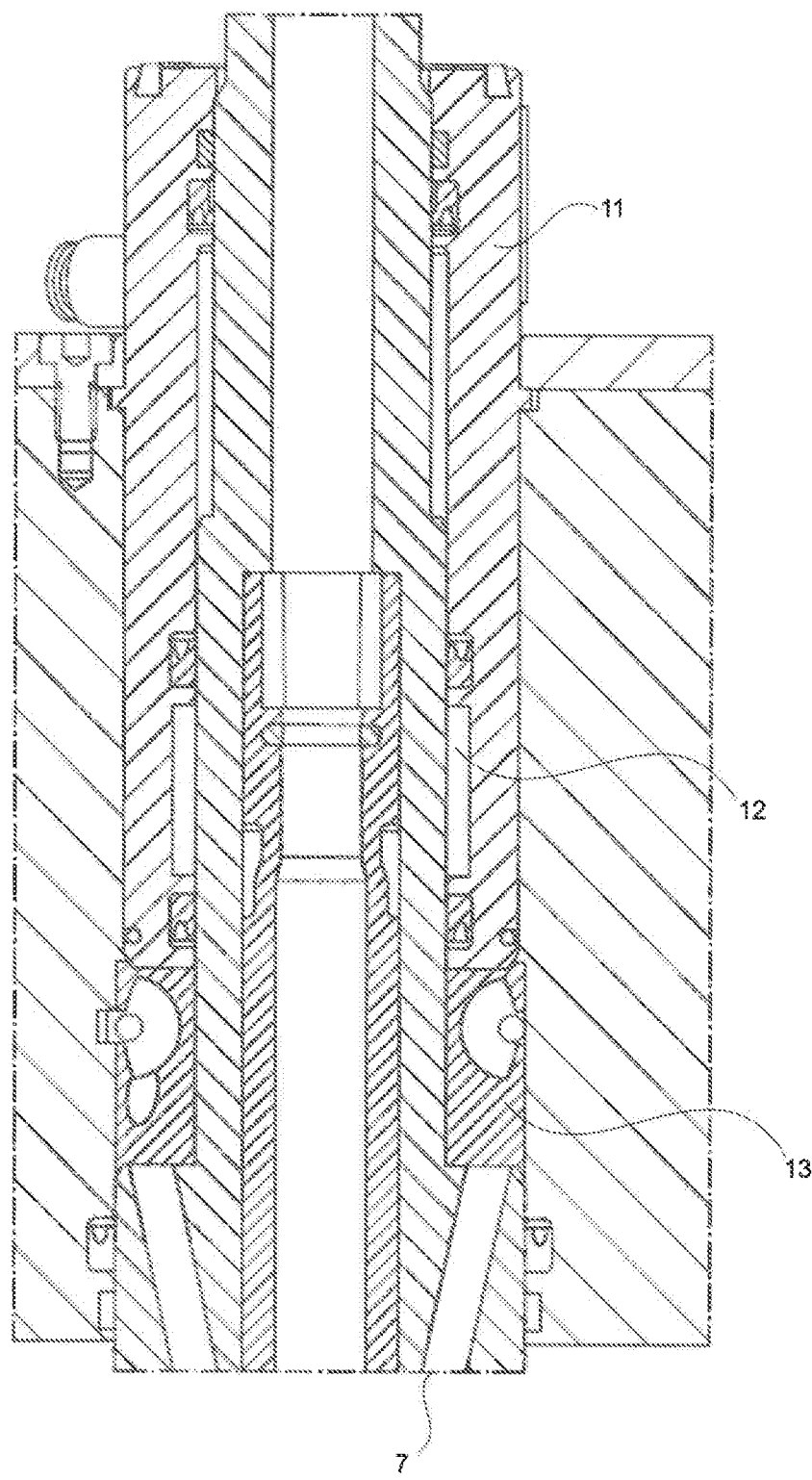
FIG. 3 shows a view of a detail of a blow moulding piston.

As mentioned above, the masses of all components of the stretching device 10 are known. Thus, these values can be included in the calculation of the desired force absorption. A further factor in this calculation is provided by the pressure conditions in the blow moulding piston and in the container itself (which is to be reshaped). An example of a blow moulding piston is shown in FIG. 3. Different pressures prevail in each of the illustrated regions 11, 12 and 13. Whilst in the region 11 a constant preload of for example 10 bars is maintained, the region 12 is usually at a constant lower ambient pressure. On the other hand, on the annular surface in the region 13 the pressure changes during the blow moulding process. The pressure applied there corresponds at least intermittently to the blow moulding pressure and is dependent upon the respective pressure stage. The pressure here may be for example up to 40 bars. The counter-pressure here acting on the annular surface 13 is also inter alia dependent upon the diameter of the blow moulding die 7 and/or the bottle neck.

Figure 4:
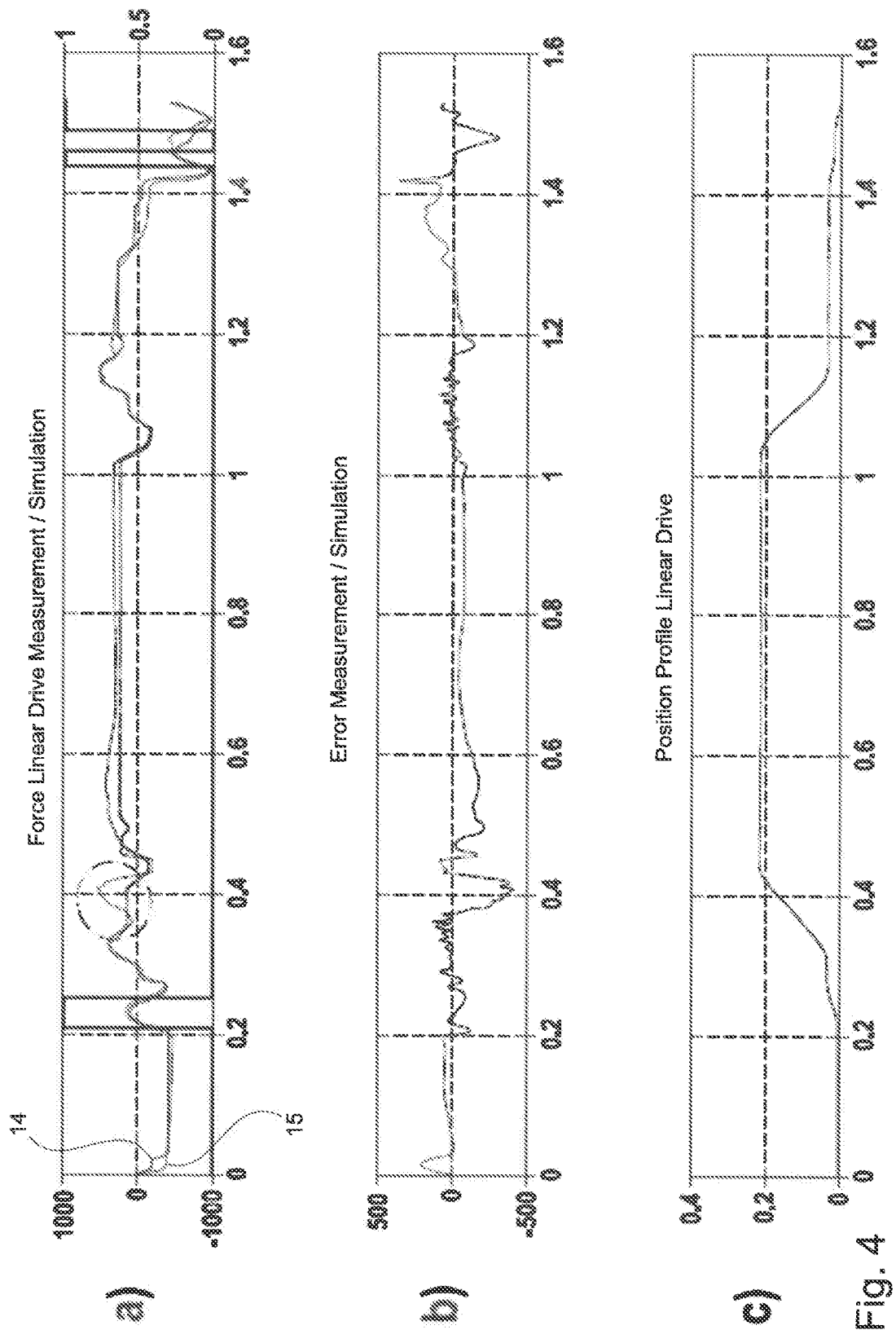
FIG. 4a shows a representation of the progression of the desired force absorption and the actual force absorption over the duration of a stretching/blow moulding process.
FIG. 4b shows a representation of the difference in the progression illustrated in FIG. 4a of the desired force absorption and the actual force absorption over the duration of a stretching/blow moulding process.
FIG. 4c shows a representation of the position profile of the linear drive over the duration of a stretching/blow moulding process.

FIGS. 4a-c each show diagrams of process parameters during a reshaping process. FIG. 4a shows a representation of the progression of the desired force absorption (line 14), as obtained by a simulation as described above, and the actual force absorption (line 15) over the duration of a stretching/blow moulding process. The stretching/blow moulding process in the present example lasts for instance for 1.5 units of time. During this the linear drive changes its position along the position profile illustrated in FIG. 4c. As can be seen from this, at first the position does not change, in order then to be displaced (with a small step) up to a maximum change of position of approximately 0.2 units of distance. In this position the linear drive remains unchanged for a certain time, until after somewhat more than 1.0 unit of time it starts a reverse movement back into the starting position. It reaches this after a two-stage movement, of which the first stage is maintained significantly longer than the second, after approximately 1.5 units of time.

In a comparison of the desired force absorption 14 with the actual force absorption 15 in FIG. 4a it can be seen that they extend substantially parallel over wide time ranges, but after approximately 0.4 units of time they deviate significantly from one another, in order to approach one another again and extend almost parallel again.

If the values of the actual force absorption 15 are subtracted from those of the desired force absorption 14, a diagram is obtained such as is illustrated in FIG. 4b. In order to show the deviations more clearly, the scale has been changed by comparison with the representation in FIG. 4a. Variations from the zero line can be seen in particular after 0.4 units of time.

In conjunction with the representation according to FIG. 4c and consideration of the entire stretch/blow moulding process it can be deduced that the deviation of the measured force from the value determined in the simulation results from the fact that the stretching force for deformation of the preform has not been taken into consideration in the modelling which has been undertaken. Thus, from such variations it is possible to derive information about the progress of the stretch/blow moulding process and in particular about the force for displacement of the linear drive necessary at different times.

The applicant reserves the right to claim all the features disclosed in the application documents as essential to the invention in so far as they are individually or in combination novel over the prior art.

LIST OF REFERENCES 1 stretching slide
2 guide carriage
3 guide track
4 blow moulding slide
5 guide carriage
6 blow moulding piston
7 blow moulding die
8 guide sleeve
9 stretching rod
10 stretching device, stretching unit
11 region
12 region
13 region, annular surface
14 desired force absorption
15 actual force absorption

The invention claimed is:

1. A method for determination of a friction coefficient of a linear drive for a stretching and/or blow moulding machine, comprising the following steps:
  determining a desired force absorption of the linear drive during operation,
  determining an actual force absorption of the linear drive during operation using a force sensor,
  comparing the actual force absorption with the desired force absorption, and
  outputting a signal when a previously defined deviation between desired force absorption and actual force absorption is exceeded, wherein the data for a desired force absorption of the linear drive during operation are calculated from parameters which are selected from a group consisting of a weight force of the moving parts, an inertial force of the moving parts depending upon an underlying movement profile, a pressure prevailing in the container or the preform, pneumatically effective surfaces of the system and a frictional force of the stretching unit and from the parameters a model is calculated which includes a variable for the frictional force on the stretching unit and in a subsequent optimisation process simulations of the desired force absorption of the linear drive are carried out by variation of values for the frictional force simulation until a sufficiently good approximation between the simulation of the desired force absorption and the actual force absorption of the linear drive is achieved.

2. The method according to claim 1, wherein the force sensor detects current consumption necessary for movement of a stretching rod.

3. The method according to claim 2, wherein a time range of the process which is particularly suitable for identification of the friction coefficient is selected for comparison of the actual force absorption with the desired force absorption.

4. The method according to claim 2, wherein on the basis of the comparison of the actual force absorption with the desired force absorption a required maintenance cycle for the cleaning of the stretching unit is determined.

5. The method according to claim 1, wherein a time range of the process which is particularly suitable for identification of the friction coefficient is selected for comparison of the actual force absorption with the desired force absorption.

6. The method according to claim 1, wherein on the basis of the comparison of the actual force absorption with the desired force absorption a required maintenance cycle for the cleaning of the stretching unit is determined.

7. A linear drive for a stretch and/or blow moulding machine, said linear drive including a force sensor for detecting an actual force absorption of the linear drive during operation, a storage device in which data for a desired force absorption of the linear drive during operation are stored, a comparison device for comparing the actual force absorption with the desired force absorption, a signal emitter for outputting a signal if a previously defined deviation between the desired force absorption and actual force absorption is exceeded, and a data processing unit for calculating the data for a desired force absorption of the linear drive during operation from parameters which are selected from a group consisting of a weight force of the moving parts, an inertial force of the moving parts depending upon an underlying movement profile, a pressure prevailing in the container or the preform, pneumatically effective surfaces of the system and a frictional force of the stretching unit, and for calculating a model from the parameters which includes a variable for the frictional force on the stretching unit and for carrying out optimisation process simulations of the desired force absorption of the linear drive including variation of values for the frictional force simulation until a sufficiently good approximation between the simulation of the desired force absorption and the actual force absorption of the linear drive is achieved.

8. The linear drive according to claim 7, wherein the force sensor is a detector for current consumption necessary for movement of stretching rod.

9. The linear drive according to claim 7, wherein the storage device comprises a plurality of data sets for the desired force absorption of the linear drive for different reshapings of preforms into containers.

* * * * *